US012746616B2

(12) United States Patent
Fujii et al.

(10) Patent No.: US 12,746,616 B2
(45) Date of Patent: Sep. 29, 2026

(54) SOLID-STATE JOINING METHOD, SOLID-STATE JOINED JOINT, SOLID-STATE JOINED STRUCTURE, AND SOLID-STATE JOINING DEVICE

(71) Applicant: OSAKA UNIVERSITY, Osaka (JP)

(72) Inventors: Hidetoshi Fujii, Osaka (JP); Huihong Liu, Osaka (JP); Yoshiaki Morisada, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 0 days.

(21) Appl. No.: 18/580,395

(22) PCT Filed: Jul. 26, 2022

(86) PCT No.: PCT/JP2022/028765
§ 371 (c)(1),
(2) Date: Jan. 18, 2024

(87) PCT Pub. No.: WO2023/021945
PCT Pub. Date: Feb. 23, 2023

(65) Prior Publication Data
US 2024/0316689 A1 Sep. 26, 2024

(30) Foreign Application Priority Data
Aug. 19, 2021 (JP) ................................ 2021-133759

(51) Int. Cl.
*B23K 20/00* (2006.01)
*B23K 20/12* (2006.01)
(Continued)

(52) U.S. Cl.
CPC ........ *B23K 20/129* (2013.01); *B23K 2103/04* (2018.08); *B23K 2103/10* (2018.08); *B23K 2103/12* (2018.08)

(58) Field of Classification Search
CPC .... B23K 20/129; B23K 20/12; B23K 33/006; B23K 13/01; B23K 13/025; B23K 20/1205
See application file for complete search history.

(56) References Cited

U.S. PATENT DOCUMENTS 2,552,468 A * 5/1951 Vosters ................ B23K 33/004 219/137 R
3,697,718 A * 10/1972 Von Hollen .......... B21C 37/122 219/105

(Continued)

FOREIGN PATENT DOCUMENTS

JP 5577988 B2 * 8/2014

*Primary Examiner* — Erin B Saad
(74) *Attorney, Agent, or Firm* — RANKIN, HILL & CLARK LLP

(57) ABSTRACT

Provided are: a solid-state joining method with which it is possible to control the discharge direction of burrs and to realize sufficient joining strength; a solid-state joined joint and a solid-state joined structure that are obtained through the solid-state joining method; and a solid-state joining device that can be suitably used in the solid-state joining method. A solid-state joining method characterized by having a first step for bringing end parts of one material being joined and another material being joined into butting contact with one another and forming a joining interface, a second step for increasing the temperature in the vicinity of the joining interface by using an external heating means, and a third step for plastically deforming the joining interface to thereby discharge burrs and form a solid-state joined interface, the plate thickness of the end part of the one material being joined and/or the other material being joined is reduced, and the solid-state joining method having a gradient such that the plate thickness decreases on a side where discharge of the burrs is suppressed.

5 Claims, 9 Drawing Sheets

(51) Int. Cl.

| | |
|---|---|
| *B23K 103/04* | (2006.01) |
| *B23K 103/10* | (2006.01) |
| *B23K 103/12* | (2006.01) |

(56) References Cited

U.S. PATENT DOCUMENTS

| | | | | | |
|---|---|---|---|---|---|
| 3,735,910 | A * | 5/1973 | Watson | B23K 20/12 228/114.5 |
| 5,240,167 | A * | 8/1993 | Ferte | B23K 20/129 228/114.5 |
| 9,067,279 | B1 * | 6/2015 | Shuaib | B23K 20/126 |
| 9,566,662 | B2 * | 2/2017 | Kimura | B23K 20/129 |
| 9,644,769 | B1 * | 5/2017 | Cheng | B23K 28/02 |
| 10,625,370 | B2 * | 4/2020 | Bray | B23K 20/22 |
| 10,632,563 | B2 * | 4/2020 | Bray | B23K 20/12 |
| 11,413,699 | B2 * | 8/2022 | Cheng | B23K 20/023 |
| 11,745,287 | B2 * | 9/2023 | Fujii | B23K 20/02 228/193 |
| 11,976,608 | B2 * | 5/2024 | Kahraman | F02F 3/28 |
| 2009/0220820 | A1 * | 9/2009 | Kolbe | B23K 33/008 428/615 |
| 2010/0040900 | A1 * | 2/2010 | Sumi | B60G 7/001 228/114.5 |
| 2015/0336203 | A1 * | 11/2015 | Zhai | B29C 65/06 228/2.1 |
| 2018/0029158 | A1 * | 2/2018 | Bray | B23K 33/006 |
| 2018/0065205 | A1 * | 3/2018 | Geyer | B23K 13/025 |
| 2020/0023458 | A1 * | 1/2020 | Fujii | B23K 20/121 |
| 2021/0346978 | A1 * | 11/2021 | Nagai | F15B 15/1457 |
| 2022/0371120 | A1 * | 11/2022 | Fujii | B23K 20/16 |

* cited by examiner

End angle θ: 15°

End angle θ: 30°

End angle θ: 45°

SOLID-STATE JOINING METHOD, SOLID-STATE JOINED JOINT, SOLID-STATE JOINED STRUCTURE, AND SOLID-STATE JOINING DEVICE

The present invention relates to a method for solid-state joining metal materials, a solid-state joined joint and a solid-state joined structure obtained by the solid-state joining method, and a solid-state joining device that can be suitably used in the solid-state joining method.

BACKGROUND ART

With the increase in strength of metal materials such as steel and aluminum alloys, the decrease in strength at the joined portion that determine the mechanical properties of the joined structure has become a serious problem. On the other hand, in recent years, attention has been paid to a solid phase joining method in which the maximum temperature reached during joining does not reach the melting point of the material to be joined and the decrease in strength at the joined portion is smaller than that of conventional melt welding, and it is rapidly progressing to put into practical use.

In particular, the friction welding (FW: Friction Welding), in which cylindrical metal members are rotated and slid together and the linear friction welding (LFW: Linear Friction Welding), in which metal members are slid together in a linear trajectory, do not require the use of a tool, unlike the friction stir welding (FSW: Friction Stir Welding), can be easily applied to metals having a high melting temperature, and is expected to be put to practical use in various industries.

For example, Patent Document 1 (Japanese Patent Unexamined Publication No. 2001-287051) proposes a method which provides a friction pressure welding joint of high tensile steel whose hardness becomes almost uniform over the direction of the radius of rotation of the friction pressure welding.

The friction pressure welding joint of high tensile steel described in Patent Document 1 is a friction pressure welding joint of high tensile steel having a fine structure of a crystal grain diameter of 2 μm or below, a tensile strength of 60 kgf/mm$^2$ or above, and a carbon content of 0.1 wt % or below, and the carbon content of the high tensile steel is suppressed as low as 0.1 wt %. Due to the low carbon content of 0.1 wt % or below, when carrying out the friction pressure welding, the structural change at peripheral part of the high tensile steel can be suppressed to suppress the hardening.

Further, Patent Document 2 (Japanese Patent Unexamined Publication No. 2002-294404) proposes a high carbon steel material suited for friction pressure welding with less increase in hardness at friction pressure welding, and provides its production method.

The member (steel member) to be joined through friction pressure welding is subjected to extremely rapid heating and cooling cycle where the member is rapidly heated to a temperature of just below its melting point for about 10 seconds under a high pressure and then rapidly cooled from 1200° C. or more. As a result, the crystal grain of the member is coarsened at the rapid heating, and thereafter, transformed to a hard martensite phase at the rapid cooling, which makes the hardness of the joined part increase.

To the contrary, according to the high carbon steel described in the above Patent Document 2, by including a solid solution Nb in an amount of 0.005% or more, it is possible to prevent the austenite crystal grain of the high carbon steel from coarsening, and a grain number of austenite measured after heat treatment at 800° C.×5 minutes by oxidization method according to the standard of JIS G 0551 is 9 or more, which results in suppressing the increase of the hardness of the friction pressure joined part.

Further, with respect to the linear friction welding, for example, Patent Document 3 (Japanese Patent Unexamined Publication No. 2015-164738) discloses a friction-joining apparatus for friction-joining one member to the other member wherein, in a state that the one member is brought into contact with the other member, the both members are repeatedly moved relative to each other on the same trajectory, which is characterized by providing a stopping means which, according to a command to stop the relative movement of the one member having respect to the other member, stops the relative movement of the one member to the other member during a period of time from the generation of the stopping command to one relative movement of the one member having respect to the other member on the trajectory.

In the friction-joining apparatus described in Patent Document 3, it is said that when the one member is brought into contact with the other member and is friction-joined by repeatedly moving them relative to each other on the same trajectory, it is possible to easily specify the timing of the generation of the stopping command of the relative movement at which timing the relative movement of the two members will just stop at the timing when the two members will be in an appropriate joined state.

PRIOR ART REFERENCE

Patent Reference

Patent Document 1: Japanese Patent Unexamined Publication No. 2001-287051
Patent Document 2: Japanese Patent Unexamined Publication No. 2002-294404
Patent Document 3: Japanese Patent Unexamined Publication No. 2015-164738

SUMMARY OF THE INVENTION

Problem to be Solved by the Invention

As disclosed in the aforementioned Patent Documents 1 and 2, in the solid-state joining methods such as the friction welding and the linear friction welding, the purpose is often to improve the mechanical properties of the joined portion compared to the fusion welding, and thus, the shape of the joined portion has not been sufficiently studied.

The aforementioned Patent Document 3 aims to improve the sophistication of process control in the friction welding, but the purpose is to precisely control the relative position of two members to be joined, and is not intended to control the shape of the joined portion.

However, in the solid-state joining methods such as the friction welding and the linear friction welding, in which burrs are discharged from the joined interface and new surfaces are brought into contact to achieve joining, the final shape of the joined portion, including the state of burrs, is often a big practical problem. In particular, when joining pipe materials, if burrs are formed inside the pipe materials, the pipe materials cannot be used for the purpose of circulating gas or liquid inside the pipes.

In view of the problems in the prior art as described above, an object of the present invention is to provide the solid-state joining method that can control the discharge direction of burrs and exhibit sufficient joint strength, and the solid-state joined joint and the solid-state joined structure obtained by the solid-state joining method, and the solid-state joining device that can be suitably used in the solid-state joining method.

Means to Solve the Problems

In order to achieve the above object, the present inventor has conducted intensive research on solid-state joining methods for the metal materials, and has found that it is extremely effective to control the discharge direction of burr by the shape of the end surface of the materials to be joined, which forms the interface to be joined, and then, has reached the present invention.

Namely, the present invention provides a solid-state joining method, which includes:

- a first step for bringing the end portions of one material to be joined and the other material to be joined into contact with one another to form an interface to be joined;
- a second step for increasing the temperature in the vicinity of the interface to be joined by using an external heating means; and
- a third step for plastically deforming the interface to be joined to discharge burrs and form a solid-state joined interface;
- wherein the plate thickness of the end portion of the one material to be joined and/or the other material to be joined is reduced, and
- a gradient that the plate thickness is reduced is provided on a side where the discharge of the burrs is suppressed.

In the solid-state joining method of the present invention, it is preferable that the one material to be joined and/or the other material to be joined are a pipe material. It is important to consider the internal condition of the pipe material, and by using the solid-state joining method of the present invention, the change in the inner diameter caused by the burr formation and plastic deformation of the pipe material can be extremely effectively suppressed. Note that the material to be joined according to the present invention is not limited to the pipe material, and various conventionally known metal materials can be used. For example, the joining method can be applied to joining flat plates, and the joined surface on the side where the discharge of the burr is restricted can be made flat.

Further, the external heating means used in the second step is not particularly limited as long as the effects of the present invention are not impaired, and various conventionally known external heating means can be used. Here, examples of the external heating means include energization heating, laser heating, high frequency heating, heating using arc, plasma, flame, etc., and it is preferable to use energization heating. By performing energization heating under appropriate conditions, it is possible to elevate the temperature only in the vicinity of the interface to be joined in an extremely short period of time. Note that, by using a capacitor, a high-density current can be passed in an extremely short period of time. Further, frictional heat generated by sliding of the materials to be joined may be used as the external heating means.

In addition, by using energization heating as the external heating means, it is possible to locally elevate the temperature of the end portion at the interface to be joined, which is made of the end portion where the plate thickness is reduced. As a result, plastic deformation (burr discharge) from the end portion can proceed efficiently.

Further, in the solid-state joining method of the present invention, it is preferable that the gradient is 20 to 40°. By setting the gradient to 20° or more, it is possible to reliably obtain the effect of suppressing the discharge of burrs to the side with the gradient, and by setting the gradient to 40° or less, it is possible to suppress the displacement of the position between the materials to be joined at the interface to be joined. A more preferred gradient is 25 to 35°.

Further, in the solid-state joining method of the present invention, it is preferable that the pressure is equal to or higher than the yield strength of the one material to be joined and/or the other material to be joined at a desired joining temperature. By applying the pressure equal to or higher than the yield strength of one material to be joined and/or the other material to be joined at a desired joining temperature before elevating the temperature of the interface to be joined, the joining temperature can be accurately controlled.

When joining the materials to be joined are brought into contact with each other, not by simply applying a small pressure in order to ensure the fixing of the materials to be joined and the adhesion of the interface to be joined, but by applying a large pressure in order to determine the joining temperature, the joining temperature can be controlled. The mechanism for determining the joining temperature is schematically shown in FIG. 1. FIG. 1 is a graph schematically showing the relationship between yield stress and temperature of a metal material. The yield stress of a metal material changes depending on the temperature, and the relationship between the yield stress and temperature differs depending on the metal material.

Here, for example, when butt-joining metal materials, joining is achieved by sufficiently softening the vicinity of the interface to be joined, forming a new surface at the interface to be joined, and discharging the burrs from the interface to be joined. Focusing on the deformation resistance (yield stress) of the metal material that is the material to be joined shown in FIG. 1, the deformation resistance becomes low when the temperature is high and becomes high when the temperature is low. That is, when applying the pressure in the vicinity of the interface to be joined, by applying a higher pressure, the deformation and the burr discharge start at a lower temperature, and as a result, the joining is achieved at a lower temperature. In FIG. 1, specifically, when a pressure $P_1$ is applied to the interface to be joined, the joining temperature of a material A becomes $t_1$, and when the pressure is increased to $P_2$, the joining temperature is lowered to the. Also, regarding a material B, by increasing the pressure from $P_1$ to $P_2$, the joining temperature is lowered from $T_1$ to $T_2$.

In the conventional solid-state joining such as the friction welding and the linear friction welding, the joining is achieved by sufficiently softening the vicinity of the interface to be joined by frictional heat, etc., and discharging a large amount of burr from the interface to be joined. Here, in the case of the friction welding or the linear friction welding, it is generally assumed that the joining temperature increases with an increase in the sliding speed of the materials to be joined, the pressing pressure between the materials to be joined, and the joining time.

However, focusing on the deformation resistance of the metal material to be joined, the deformation resistance becomes low when the temperature is high, and becomes high when the temperature is low. That is, when applying a pressure near the interface to be joined, by applying a higher pressure, the burr is discharged at a lower temperature, and as a result, the joining is achieved at a lower temperature. The solid-state joining method of the present invention is based on the mechanism revealed by the present inventor, and since the relationship between the deformation resistance and the temperature of a specific metal material is substantially constant, it is possible to precisely control the joining temperature by the pressure applied to the vicinity of the interface to be joined.

Specifically, in the first step, the materials to be joined are brought into contact with each other to form the interface to be joined, and a pressure equal to or higher than the yield stress of the one material to be joined and/or the other material to be joined at a desired joining temperature is applied in the direction substantially perpendicular to the interface to be joined. Thereafter, in the second step, by elevating the temperature in the vicinity of the interface to be joined, at the time when the temperature just reaches the joining temperature set in the first step, the vicinity of the interface to be joined is deformed so that the new surfaces of the one material to be joined and the other material to be joined are brought into contact with each other (depending on the conditions, the burrs are discharged), and then the joining is achieved. In other words, the pressure applied in the first step serves as a trigger, making it possible to accurately control the joining temperature. Note that it is preferable that the pressure applied in the first step is equal to or larger than the yield strength and less than the tensile strength of the one material to be joined and/or the other material to be joined at a desired joining temperature.

Here, the timing of applying the pressure in the first step may be any time before reaching the desired joining temperature (the temperature at which the vicinity of the interface to be joined is deformed by the pressure). For example, in the case where the rate of temperature elevation in the second step is slow, there is a case where the timing of applying the pressure in the first step is after the start of the second step.

Further, in the solid-state joining method of the present invention, it is important to uniformly elevate the temperature of the entire interface to be joined, and for this purpose, the above-mentioned external heating means may be used in combination. In addition, if necessary, external cooling means such as supply of liquid $CO_2$, liquid nitrogen, etc., and air blowing may be used together.

In the solid-state joining method of the present invention, in addition to being able to obtain a solid-state joined portion having a desired shape by controlling the discharge direction of burrs depending on the shape of the end of the materials to be joined, by controlling the joining temperature by the joining pressure, the fine structure of the solid-state joined portion and the mechanical properties resulting from the fine structure can be expressed. Furthermore, by controlling the amount of burr discharged (the burn-off length at the joining), it is possible to obtain a good interface to be joined formed by the new surfaces bring into contact with each other.

Further, the present invention also provides a solid-state joined joint, which has a solid-state joined portion where one pipe material and the other pipe material are integrated through a solid-state joined interface, and the changing rate of the inner diameter of the pipe at the solid-state joined portion is within 20%.

The most important feature of the solid-state joined joint of the present invention is that at least one of the materials to be joined is a pipe material, and the discharge of burrs to the inside of the pipe material and the plastic deformation of the pipe material are suppressed. As a result, the changing rate of the inner diameter of the pipe at the solid-state joined portion is within 20%. More preferable changing rate is within 15%, and the most preferable changing rate is within 10%. Note that the present invention also includes those in which the joined portion is subjected to post-processing such as cutting.

In the solid-state joined joint of the present invention, it is preferable that the one pipe material and/or the other pipe material are steel pipes. For the steel pipe, a variety of materials such as stainless steel and carbon steel are used, and in all cases, the temperature in the vicinity of the interface to be joined can be easily elevated by resistance heat generation, and a good joined portion can be efficiently formed. Further, for example, by joining a steel pipe and an aluminum pipe as dissimilar materials, it is possible to reduce the weight of the metal structure.

In the solid-state joined joint of the present invention, it is preferable that the one pipe material and/or the other pipe material are copper pipes. By using the copper pipe, it is possible to suitably use as piping for a heat exchanger. In addition, since copper has a low electrical resistance and a high thermal conductivity, it is difficult to elevate the temperature by resistive heat generation using electricity, but, when the gradation is provided with the end portion where the interface to be joined is formed to make the end tapered shape, the current density is increased during energizing, which makes it possible to elevate the temperature efficiently.

Further, in the solid-state joined joint of the present invention, it is preferable that the one pipe material and/or the other pipe material are aluminum pipes. By using the aluminum pipe, it can be suitably used in applications that require weight reduction. Further, by using a dissimilar solid-state joined joint between the aluminum pipe and the copper pipe, and creating a piping structure in which the right materials are used in the right places, it is possible to reduce the weight of piping that has conventionally used copper pipes.

The present invention also provides a solid-state joined structure, which has the pipe material joint of the present invention. The solid-state joined structure of the present invention may be composed only of the pipe material joint of the present invention, or other members may be joined. Further, the method of joining the pipe material joint of the present invention and other members is not particularly limited, and joining methods other than the solid-state joining such as brazing and welding may be used.

Furthermore, the present invention provides a solid-state joining device which comprises:

- a pressurizing mechanism where the end portion of the one material to be joined is brought into contact with the end portion of the other material to be joined to form the interface to be joined, and a pressure is applied in the direction substantially perpendicular to the interface to be joined, and
- an energization mechanism that supplies electricity from the one material to be joined via the interface to be joined to the other material to be joined to elevate the temperature in the vicinity of the interface to be joined;
- wherein the one material to be joined and/or the other material to be joined in which the plate thickness of the end portion is reduced is used, and
- a burn-off length controlling mechanism that controls the burn-off length for discharging the burr to the opposite side to the gradient.

The solid-state joining device of the present invention is simple and has a basic configuration of the pressurizing mechanism, the energization mechanism, and the burn-off length controlling mechanism, and does not require the rotation mechanism of the friction welding device or the linear sliding mechanism of the linear friction welding device. As a result, the structure can be simplified and the price can be significantly reduced.

Here, for example, conventional resistance spot welding machines and seam welding machines are also capable of applying electricity and applying pressure to the area to be joined, but the electricity is used to elevate the temperature to a higher temperature for the purpose of melting the material to be joined, and, on the other hand, the pressure is kept at a low value enough to ensure the adhesion between the materials to be joined. To the contrary, in the solid-state joining device of the present invention, since the joining temperature is controlled by the applied pressure, it is preferable that the joining pressure can be controlled in the range of 100 to 1000 MPa by the pressure mechanism, and the temperature in the vicinity of the interface to be joined can be elevated to 100 to 1000° C. by the energization mechanism.

On the other hand, the solid-state joining device of the present invention can also be manufactured by using the conventional resistance spot welding machines or seam welding machines as a base. For example, it is possible to remodel the resistance spot welding machine to the solid-state joining device of the present invention, by using a high-speed inverter-controlled power source or the like as the power source, which makes possible to rapidly heat the vicinity of the interface to be joined due to ultra-short pulses, and in addition, by making it possible to set the pressure applied by the electrode to a high level. Here, a mechanical (electric) servo press device has a fast response speed, and the movement of the slide can be set at an arbitrary speed, and can be suitably used as the pressurizing mechanism of the solid-state joining device of the present invention.

Further, the burn-off length controlling mechanism used in the solid-state joining device of the present invention may be any mechanism as long as can control the set burn-off length and burn-off length speed according to the situation of the burr formation, and for example, it may be a mechanism composed of various conventionally known servo motors.

Effects of the Invention

According to the present invention, it is possible to provide the solid-state joining method that can control the discharge direction of burrs and exhibit sufficient joint strength, and the solid-state joined joint and the solid-state joined structure obtained by the solid-state joining method, and the solid-state joining device that can be suitably used in the solid-state joining method.

MODE FOR CARRYING OUT THE INVENTION

In the following, by referring the drawings, as the typical embodiments of the solid-state joining method, the solid-state joined joint, the solid-state joined structure and the solid-state joining device of the present invention is explained in detail, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Solid-State Joining Method

The solid-state joining method of the present invention includes the first step of forming the interface to be joined and applying the pressure necessary for joining, and the second step of elevating the temperature of the interface to be joined. Each step will be explained in detail below.

(1-1) First Step (Pressure Application Step)

In the first step, the interface to be joined is formed and the pressure necessary for joining is applied to determine the joining temperature. In the fusion welding where materials to be joined are melted, the pressure applied to the materials to be joined is intended to bring the materials into close contact with each other, and the pressure does not affect the joining temperature. On the other hand, when joining is performed in a solid-state without melting the vicinity of the interface to be joined, the joining temperature can be accurately determined by the pressure.

Figure 1:
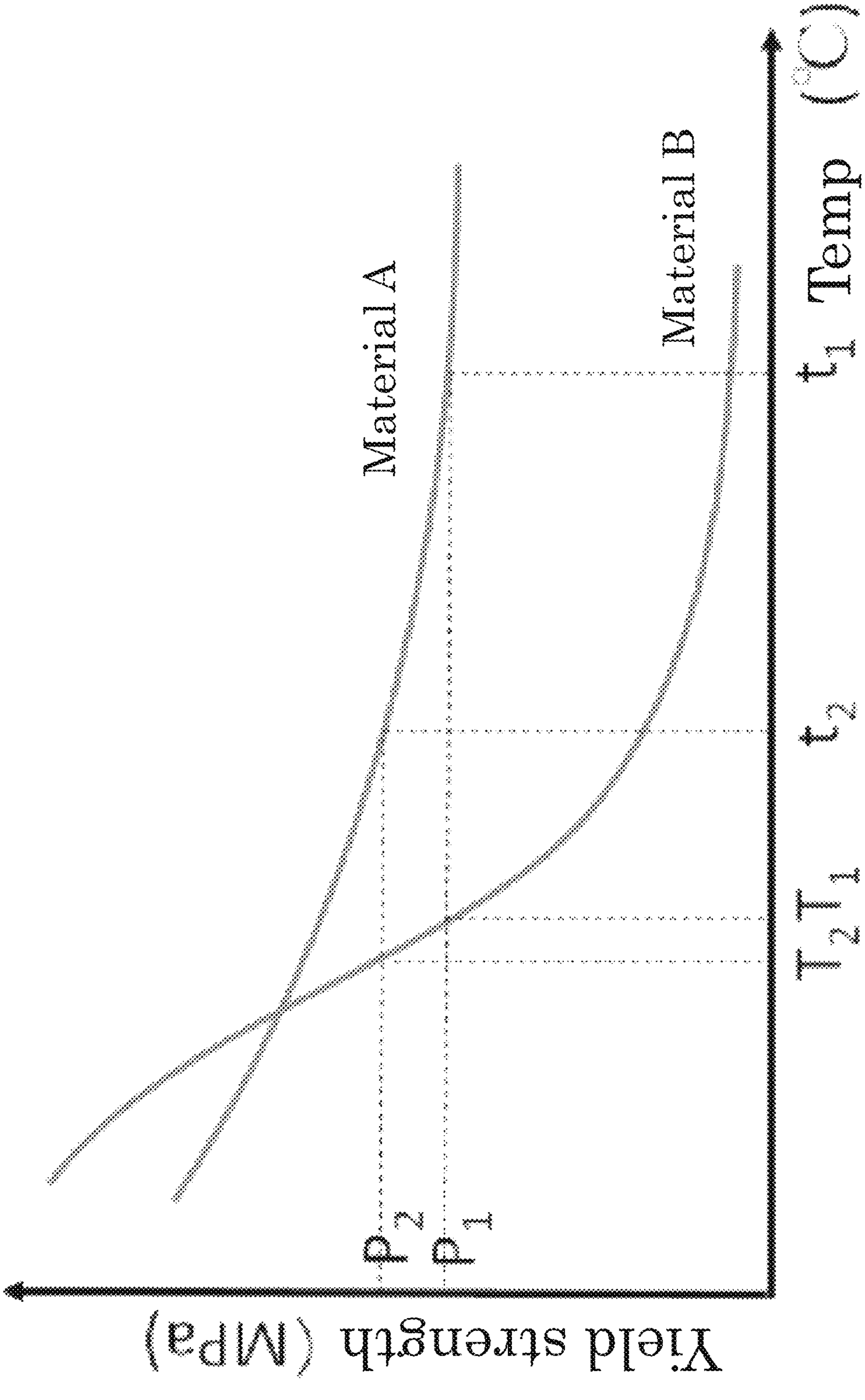
FIG. 1 is a conceptual diagram showing the mechanism for determining the joining temperature in the present invention.
Figure 2:
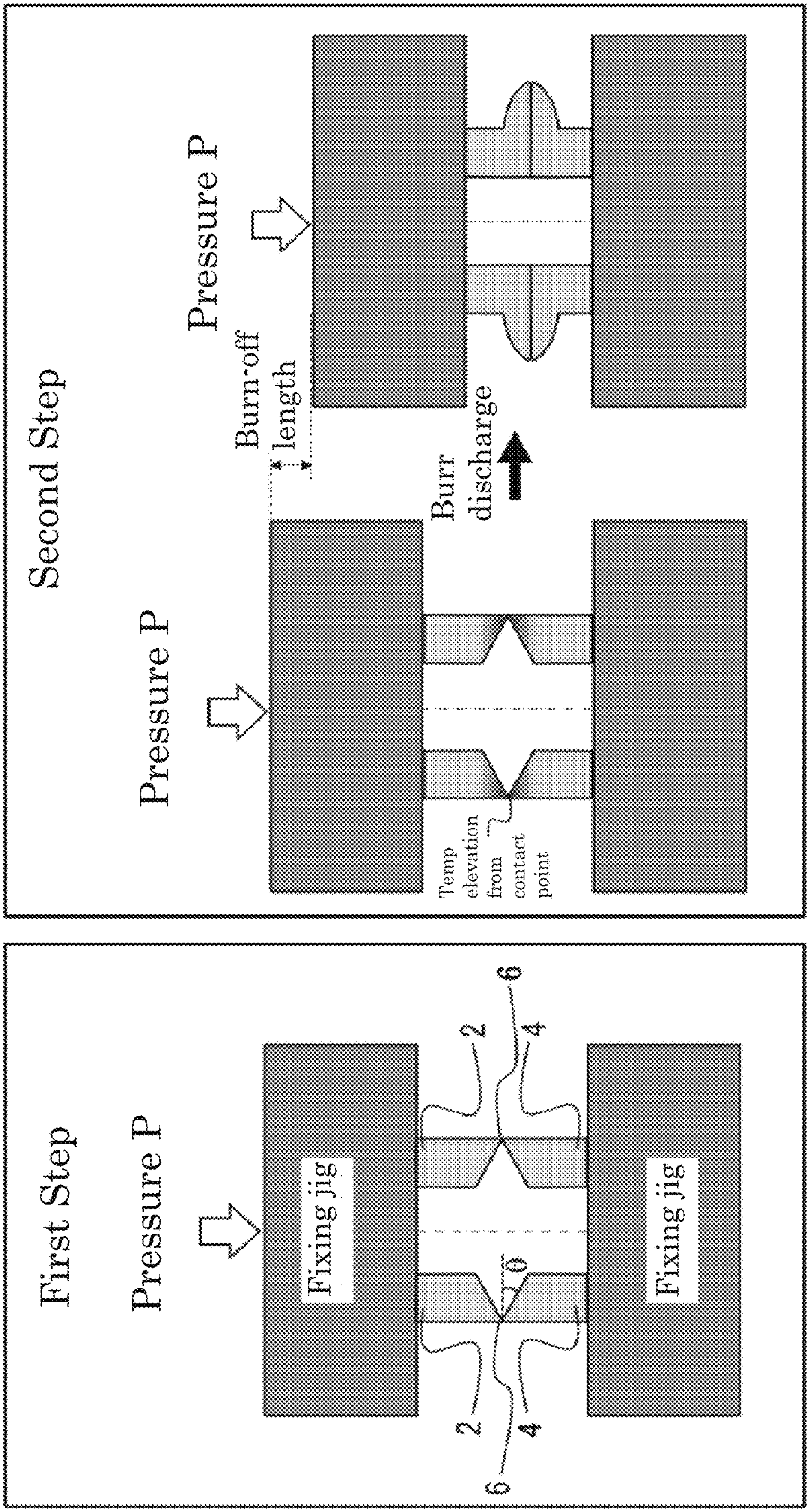
FIG. 2 is a schematic diagram of the progress of joining in the solid-state joining method of the present invention.
Figure 3:
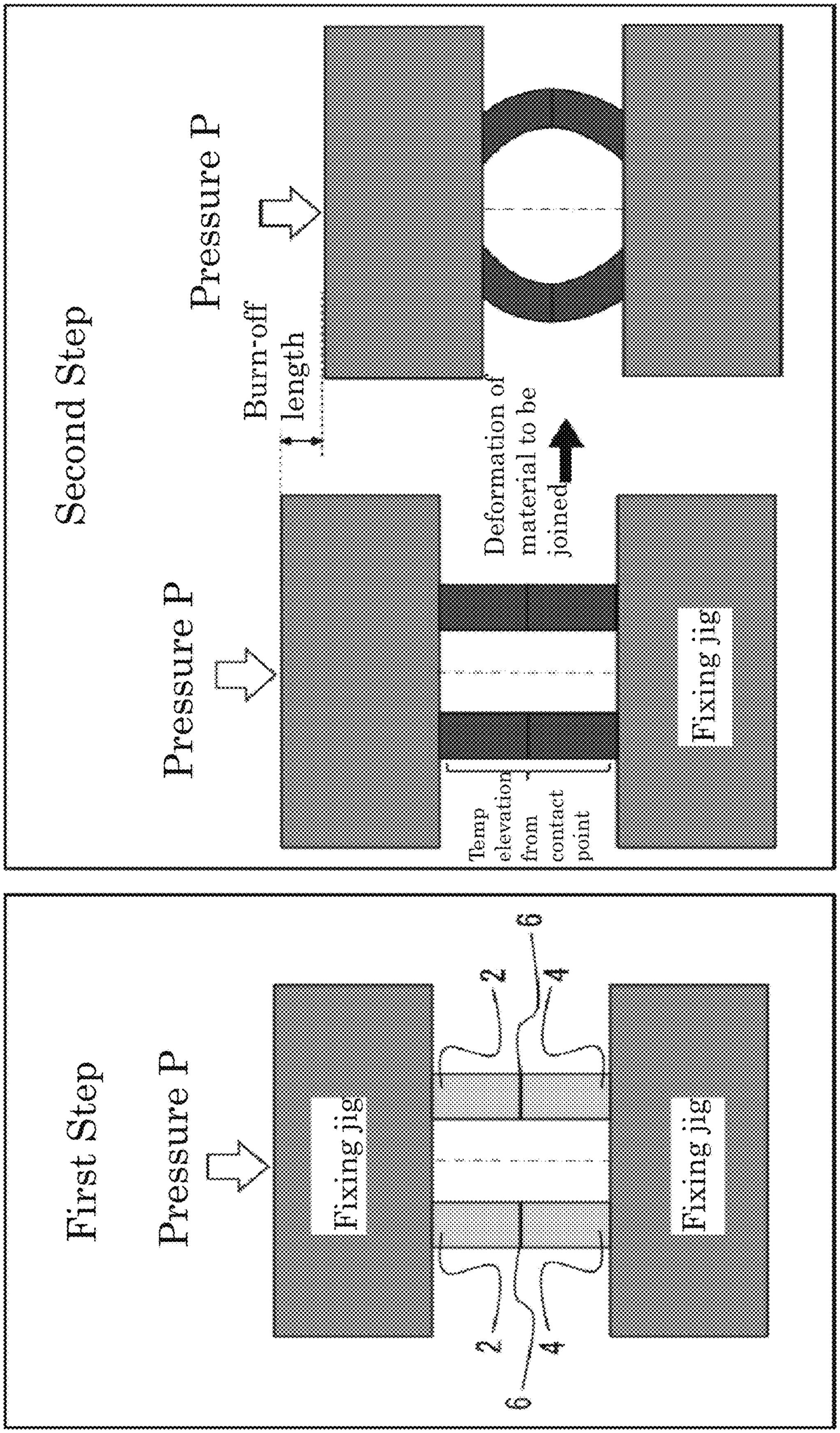
FIG. 3 is a schematic diagram of the progress of joining when no gradient is provided at the end portion of the materials to be joined.

FIG. 2 shows a schematic diagram of the progress of joining in the solid-state joining method of the present invention. Further, for comparison, FIG. 3 shows a schematic diagram of the progress of joining when no gradient is provided at the end portion of the materials to be joined. In either case, the pipe materials are joined together, and the materials to be joined are shown as cross-sectional views.

In the first step, after the one material 2 to be joined and the other material 4 to be joined are brought into contact with each other to form the interface 6 to be joined, a pressure P equal to or higher than the yield strength of the one material 2 to be joined and/or the other material 4 to be joined is applied to the interface 6 to be joined in a substantially perpendicular direction at a desired joining temperature. Here, when the end portion is not gradient, the pressure P is set based on the area of the end surface forming the interface 6 to be joined, but even when the end portion is gradient, the pressure P may be determined based on the reference that the area of the end surface in the state where there is no gradient. Further, if the pressure P determined by the method is equal to or higher than the strength near the end surface at room temperature (when the end surface is plastically deformed in the first step), after applying a pressure that does not cause plastic deformation and starting energization, the pressure may be increased as the contact surface increases, and the pressure may be controlled to finally reach the pressure P.

The joining temperature can be controlled by setting the pressure P to equal to or higher than the yield stress of the one material 2 to be joined and/or the other material 4 to be joined. Here, when the pressure P is set to equal to or higher than the yield stress of the material to be joined, the deformation of the vicinity of the interface 6 to be joined and the discharge of burrs are started, and when the pressure P is increased more, the deformation and the discharge of burrs is accelerated. Since the yield stress at a specific temperature is substantially constant depending on the material to be joined, the joining temperature corresponding to the set pressure P can be realized.

Figure 4:
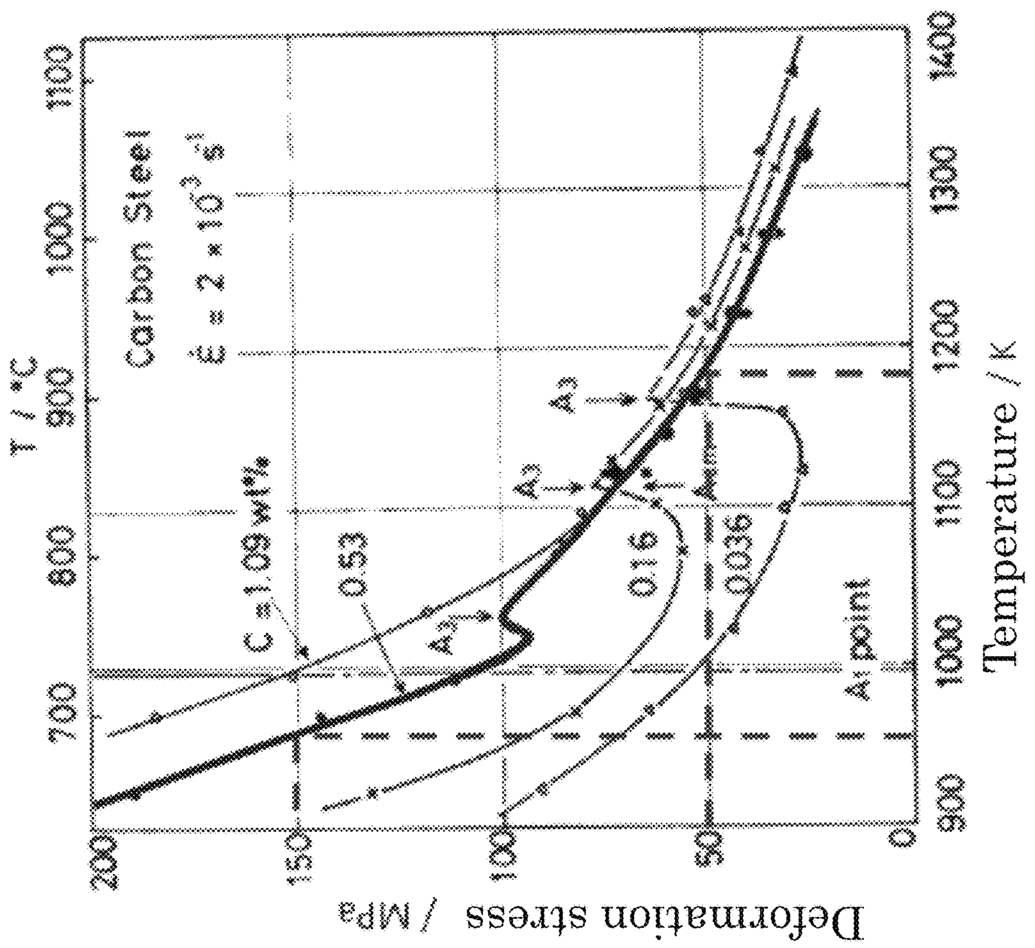
FIG. 4 is a graph showing the deformation stress (yield stress) of carbon steel at each temperature.

As a specific example, FIG. 4 shows the deformation stress (yield stress) of the carbon steel at each temperature. FIG. 4 is a graph published in "Iron and Steel, No. 11, the $67^{th}$ year (1981), p. 140". As shown in FIG. 4, the yield stress at a specific temperature is substantially constant depending on the material.

That is, when the pressure P at the time of joining is set high, the material to be joined having higher yield strength can be deformed, and the joining temperature can be lowered. Further, as shown in FIG. 4, since the yield stress at a specific temperature is substantially constant depending on the material, the joining temperature can be controlled extremely accurately. For example, in case that the carbon content is 0.53 wt %, when the pressure P is 150 MPa, the temperature can be 950 K, and when the pressure is 50 MPa, the temperature can be 1180 K.

Here, it is more preferable that the pressure P is the flow stress of the one material 2 to be joined and/or the other material 4 to be joined at the desired joining temperature. By using the pressure P applied substantially perpendicularly to the interface 6 to be joined as the flow stress of the one material 2 to be joined and/or the other of the material 4 to be joined, the deformation and discharge of burrs in the vicinity of the interface 6 to be joined continuously and reliably start at the set joining temperature, and then stable joining can be achieved with minimal pressure.

The materials of the one material 2 to be joined and the other material 4 to be joined are not particularly limited as long as the effects of the present invention are not impaired, and may be any material which has a metal phase that can be metallurgically joined, and preferable are copper, a copper alloy, aluminum or an aluminum alloy. Since these metals have a low electrical resistance and a high thermal conductivity, it is difficult to elevate the temperature by resistive heat generation using electricity, but, when the gradation is provided with the end portion where the interface to be joined is formed to make the end tapered shape, the current density is increased during energizing, which makes it possible to elevate the temperature efficiently. On the other hand, by using steel as the material for the one material 2 to be joined and the other material 4 to be joined, resistance heat generation becomes easy, and a good joined portion can be easily obtained.

Further, the shape and size of the one material 2 to be joined and the other material 4 to be joined are not particularly limited as long as the effects of the present invention are not impaired, and can achieve desired pressurization, temperature rise, etc. by the joining device, and a pipe material is preferable. It is important to consider the internal condition of the pipe material, and by using the solid-state joining method of the present invention, the change in the inner diameter caused by the burr formation and plastic deformation of the pipe material can be extremely effectively suppressed. Note that the material to be joined according to the present invention is not limited to the pipe material, and various conventionally known metal materials can be used. For example, the joining method can be applied to joining flat plates, and the joined surface on the side where the discharge of the burr is restricted can be made flat.

It is preferable that the gradient of the end portion of the material to be joined (θ in FIG. 2) is 20 to 40°. By setting the gradient to 20° or more, it is possible to reliably obtain the effect of suppressing the discharge of burrs to the side having the gradient, and by setting the gradient to 40° or less, it is possible to suppress misalignment between the two materials to be joined at the interface 6 to be joined. More preferred gradient is 25 to 35°.

(1-2) Second Step

The second step is a step in which the temperature in the vicinity of the interface 6 to be joined is elevated to the joining temperature by the external heating means while the pressure P is applied substantially perpendicularly to the interface 6 to be joined.

The method for raising the vicinity of the interface 6 to be joined by the external heating means is not particularly limited as long as the effects of the present invention are not impaired, and various conventionally known external heating means can be used. Examples of the external heating means include energization heating, laser heating, high frequency heating, heating using arc, plasma, flame, etc., and it is preferable to use energization heating. By performing energization heating under appropriate conditions, it is possible to elevate the temperature only in the vicinity of the interface 6 to be joined in an extremely short period of time. Note that, by using a capacitor, a high-density current can be passed in an extremely short period of time. Further, frictional heat generated by sliding of the materials to be joined may be used as the external heating means.

When no gradient is provided with the end portions of the materials to be joined, the discharge direction of burr is basically both outside and inside of the materials (2, 4) to be joined, and it is extremely difficult to control the discharge direction. Further, when the energization heating is used as the external heating means, the current density becomes the same value throughout the protrusion portion, and the temperature of the entire area increases, which results in increasing of the case of swollen shape in the joined portion as shown in FIG. 3. Although the deformation behavior may vary depending on the state of contact between the end surfaces and the state of application of joining pressure, the inner diameter cannot be maintained as it was in any case. In addition, although FIG. 3 emphasizes the plastic deformation of the entire materials (2, 4) to be joined, when the end portions are not gradient, the rate at which the interface to be joined expands is small, and it is difficult to make the new surfaces sufficient contact to each other.

On the other hand, when the end portion of the materials to be joined are gradient, as shown in FIG. 2, the direction of the stress applied to the softened region due to the shape of the end portion is on the outside of the materials (2, 4) to be joined, and the burrs can be guided to the outside of the materials (2, 4) to be joined. In addition, by increasing in current density due to the gradient shape, the temperature increases from the extreme end portion of the materials (2, 4) to be joined, which softens and plastically deforms from this region, causing the discharge of burrs to the outside of the materials (2, 4) to be joined more reliably. Furthermore, by sequentially shearing and deforming the interface 6 to be joined, the interface 6 to be joined can be efficiently expanded, and a good interface to be joined can be efficiently formed by closed contact of the new surfaces. Further, since the shearing deformation progresses sequentially from the extreme end portion, the plastic deformation of the materials (2, 4) to be joined as a whole as shown in FIG. 3 can be suppressed.

(1-3) Other Joining Conditions

In the solid-state joining method of the present invention, it is necessary to set joining parameters (joining time, burn-off length, and the like) other than the pressure P and the joining temperature, but these values are not limited as long as the effect of the present invention is not impaired, and may be appropriately set depending on the property, shape, size and the like of the material to be joined.

Here, after the temperature of the interface 6 to be joined reaches the desired joining temperature, the timing of removing the pressure P may be appropriately set, and by removing the pressure after confirming the deformation in the vicinity of the interface 6 to be joined and the discharge of burrs from the interface 6 to be joined, a good joint can be obtained more reliably. Note that a higher pressure may be applied at the end of the joining process for the purpose of removing burrs and making the new surfaces contact more strongly.

In addition, when the vicinity of the interface 6 to be joined reaches the desired joining temperature, the timing of stopping the temperature rise by energization heating is not particularly limited, but it is preferable to stop immediately after reaching the joining temperature. By shortening the heating time as much as possible, it is possible to suppress the formation of the heat-affected zone in the vicinity of the joined interface.

(2) Solid-State Joined Joint

Figure 5:
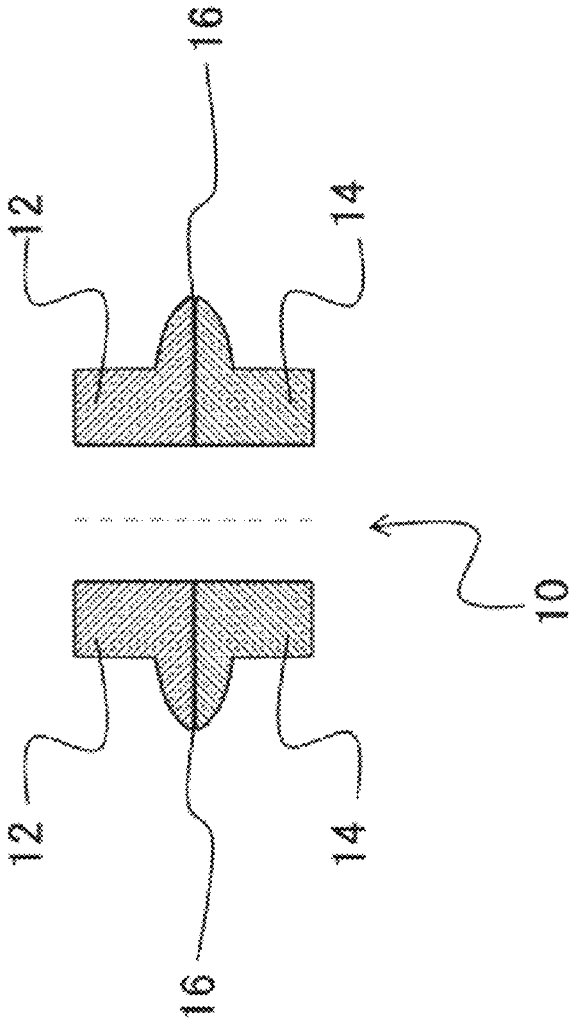
FIG. 5 is a schematic diagram showing one embodiment of the solid-state joined joint of the present invention.

A schematic cross-sectional view of the solid-state joined joint of the present invention is shown in FIG. 5. The solid-state joined joint 10 of the present invention has a solid-state joined portion where the one pipe material 12 and the other pipe material 14 are integrated via the solid-state joined interface 16, and the changing rate of the inner diameter of the pipe at the solid-state joined portion is within 20%.

The changing rate of the inner diameter of the pipe can be calculated based on the inner diameter of the pipe before joining, and the inner diameter that has changed the most due to the formation of burrs on the inside of the pipe, the plastic deformation of the pipe material (12, 14), and the like. The more preferable changing rate is within 15%, and the most preferable changing rate is within 10%. By setting the changing rate of the inner diameter at the solid-state joined portion to these values, it is possible to effectively suppress the changes in the flow resistance inside the pipe.

In the solid-state joined joint 10, it is preferable that the one pipe material 12 and/or the other pipe material 14 are steel pipes. For the steel pipe, a variety of materials such as stainless steel and carbon steel are used, and in all cases, the temperature in the vicinity of the interface to be joined can be easily elevated by resistance heat generation, and a good joined portion can be efficiently formed. Further, in the solid-state joined joint 10, it is preferable that the one pipe material 12 and/or the other pipe material 14 are copper pipes. By using the copper pipe, it is possible to suitably use as piping for a heat exchanger. In addition, since copper has a low electrical resistance and a high thermal conductivity, it is difficult to elevate the temperature by resistive heat generation using electricity, but, when the gradation is provided with the end portion where the interface 6 to be joined is formed to make the end tapered shape, the current density is increased during energizing, which makes it possible to elevate the temperature efficiently.

Further, in the solid-state joined joint 10, it is preferable that the one pipe material 12 and/or the other pipe material 14 are aluminum pipes. By using the aluminum pipe, it can be suitably used in applications that require weight reduction. Further, by using a dissimilar solid-state joined joint between the aluminum pipe and the copper pipe, and creating a piping structure in which the right materials are used in the right places, it is possible to reduce the weight of piping that has conventionally used copper pipes. Here, when directly joining the aluminum pipe and the copper pipe, since fragile intermetallic compounds are formed at the interface to be joined, it is preferable to set the joining pressure P applied during the solid-state joining to a high value to lower the joining temperature.

(3) Solid-State Joined Structure

The solid-state joined structure of the present invention is a joined structure having the solid-state joined joint 10. By having the pipe material joint where the one pipe material 12 and the other pipe material 14 are firmly joined via the solid-state joined interface 16, in addition to that the change in the pipe inner diameter of the pipe at the joined portion is suppressed, it is possible to give a high reliability to the solid-state joined structure.

Further, since the solid-state joined joint 10 suppresses the reduction or expansion of the inner diameter of the pipe at the joined portion, the change in resistance when gas or liquid flows through the pipe is reduced. As a result, the solid-state joined structure of the present invention can be suitably used in various heat exchangers, piping, and the like.

The solid-state joined structure of the present invention may be composed only of the pipe material joint of the present invention, or other members may be joined. Further, the method of joining the solid-state joined joint 10 and other members is not particularly limited, and joining methods other than solid-state joining such as brazing and welding may be used.

(4) Solid-State Joining Device for Metal Materials

Figure 6:
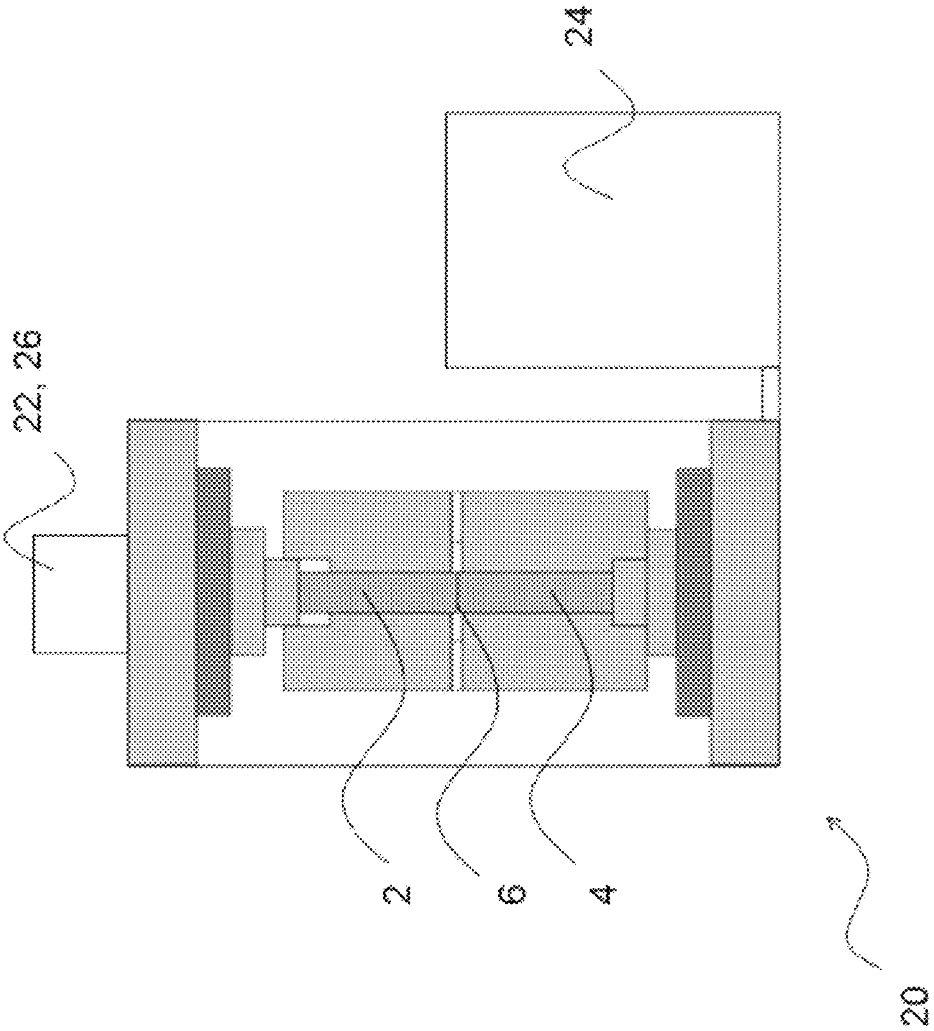
FIG. 6 is a schematic diagram showing one embodiment of the solid-state joining device of the present invention.

FIG. 6 is a schematic diagram showing one embodiment of the solid-state joining device of the present invention. The solid-state joining device 20 is composed of a pressurizing mechanism 22 where the one material 2 to be joined is brought into contact with the other material 4 to be joined to form the interface 6 to be joined, and a pressure P is applied in the direction substantially perpendicular to the interface 6 to be joined, an energization mechanism 24 that supplies electricity from the one material 2 to be joined (or the other material 4 to be joined) via the interface 6 to be joined to the other material 4 to be joined (or the one material 2 to be joined) to elevate the temperature in the vicinity of the interface 6 to be joined, and a burn-off length controlling mechanism 26 that the one material 2 to be joined and/or the other material 4 to be joined in which the plate thickness of the end portion is reduced is used to control the burn-off length for discharging the burr to the opposite side to the gradient. Note that, when the material to be joined is a pipe material, the direction in which the pressure P is applied (substantially perpendicular to the interface 6 to be joined) is the axial direction of the pipe material.

The solid-state joining device 20 is simple and has the pressurizing mechanism 22, the energization mechanism 24, and the burn-off length controlling mechanism 26, and does not require the rotation mechanism of the friction welding device or the linear sliding mechanism of the linear friction welding device. As a result, the structure can be simplified and the price can be significantly reduced.

The pressure P can be controlled in the range of 100 to 1000 MPa by the pressure mechanism 22, and the temperature in the vicinity of the interface 6 to be joined can be elevated to 100 to 1000° C. by the energization mechanism 24. Although the conventional resistance spot welding machines and seam welding machines are also capable of applying electricity and applying pressure to the area to be joined, but the electricity is used to elevate the temperature to a higher temperature for the purpose of melting the material to be joined, and, on the other hand, the pressure is kept at a low value enough to ensure the adhesion between the materials to be joined.

Further, it is preferable that the solid-state joining device 20 has a function that, by setting a desired joining temperature, the pressure P automatically becomes the flow stress of the one material 2 to be joined and/or the other material 4 to be joined at the joining temperature. Here, the flow stress at each temperature is preferably measured in the state close to the situation that occurs during the actual joining, but for example, values obtained in a high temperature tensile test at each temperature can be used. Note that, since the flow stress depends on the strain rate, it is preferable to make the tensile rate in the high temperature tensile test as close as possible to the situation during the joining.

The temperature dependence of the flow stress is unique to each metal material, and when the solid-state joining device 20 for metal materials keeps the flow stress at each temperature as a database, for example, as shown in FIG. 4, by setting the type of metal material and the desired welding temperature, the corresponding pressure can be determined. Note that it is preferable to record at least a database of various steel-based materials, coper, copper alloys, aluminum, aluminum alloys in the solid-state joining device 20.

The burn-off length controlling mechanism 26 may be any mechanism as long as can control the set burn-off length and burn-off length speed according to the situation of the burr formation, and for example, it may be a mechanism composed of various conventionally known servo motors. That is, the pressurizing mechanism 22 provided with the burn-off length controlling mechanism 26 can be suitably used.

Although the typical embodiments of the present invention have been described above, the present invention is not limited to these, and various design changes are possible, and all of these design changes are included in the technical scope of the present invention.

EXAMPLE

Example

A pipe material of medium carbon steel (JIS-S45C) was used as the material to be joined. The outer diameter of the pipe material is 10 mm, the inner diameter is 6 mm, and the length is 105 mm. The surface to be joined is machined with a lathe to obtain the materials to be joined having an angle θ shown in FIG. 2 of 15°, 30°, and 45°.

The pipe materials having the same angle θ of the end portion were butted together as shown in the first step of FIG. 2, and joined as shown in the second step of FIG. 2. The materials to be joined are sandwiched between the electrode, the graphite plate, and the WC fixing part from above and below while the end surfaces are in contact with each other, and the areas other than the vicinity of the interface to be joined are covered with a graphite mold. The pressurization in the first step and the energization in the second step are performed via the upper and lower electrodes, etc. Further, an insulator is arranged around the interface to be joined.

The joining conditions were such that the pressure applied in the first step was 250 MPa, and the current value used in the second step was 3000 A.
Further, the burn-off lengths were set to 4 mm, 5 mm, 6 mm, and 7 mm, and when reaching the set values, the energization was terminated and the load was unloaded to obtain the present example solid-state joined joints.

Comparative Example

A comparative solid-state joined joint was obtained in the same manner as in the example except that the plate thickness at the end portion was not reduced (the angle θ at the end portion was set to 0°).

Figure 7:
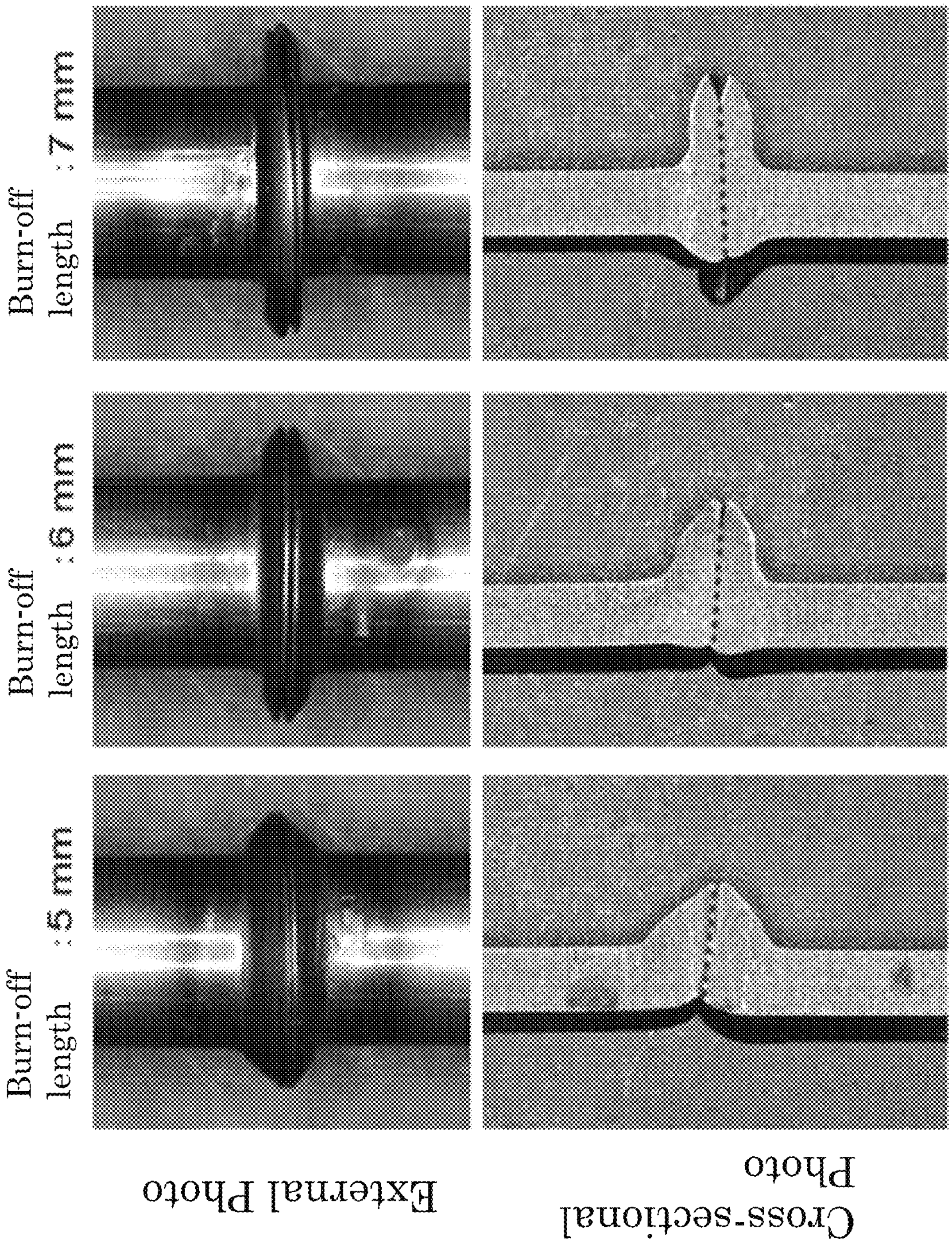
FIG. 7 is an external photograph of the example embodiment of the solid-state joined joint and the cross-sectional photograph of the joined portion.

FIG. 7 shows an external photograph of the example embodiment of the solid-state joined joint obtained with a burn-off length of 5 to 7 mm when the angle θ is 30° and a cross-sectional photograph of the joined portion thereof. Note that the cut plane includes the center of the pipe, and the cross-sectional photograph of the joined portion shows only one side. It can be seen that no large plastic deformation of the pipe material itself was observed, and that only the vicinity of the joined interface was deformed to form burrs. Further, the burrs are guided to the outer circumference of the pipe, and almost no influence of the burrs on the inner diameter of the pipe is observed. In addition, the area of the joined interface indicated by the dotted line in the figure increases as the burn-off length increases, and it can be seen that the desired joining strength can be obtained by controlling the burn-off length.

Figure 8:
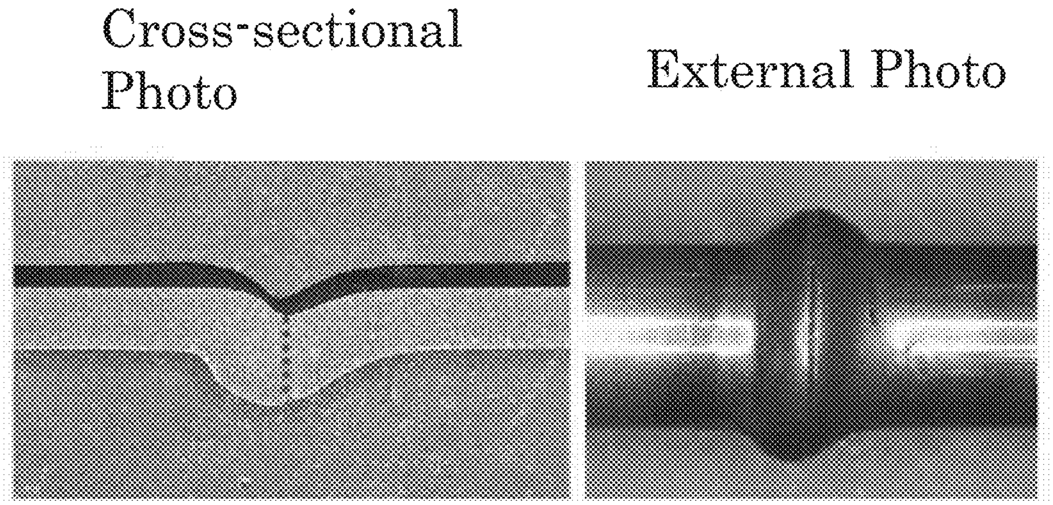
FIG. 8 is an external photograph of the comparative example of the solid-state joined joint and the cross-sectional photograph of the joined portion.

FIG. 8 shows an external photograph of the comparative solid-state joined joint obtained with a burn-off length of 4 mm and a photograph of a cross sectional photograph of the joined portion thereof. Note that the cut plane includes the center of the pipe, and the cross-sectional photograph of the joined portion shows only one side. When an appropriate taper shape is not provided to the end portion, it can be observed that the pipe material has already expanded greatly toward the outer circumferential side and is plastically deformed even when the burn-off length is small. In addition, the area of the joined interface indicated by the dotted line in the figure has hardly increased from the original area, and it is extremely difficult to form a good joined interface by bringing the new surfaces into contact with each other.

Figure 9:
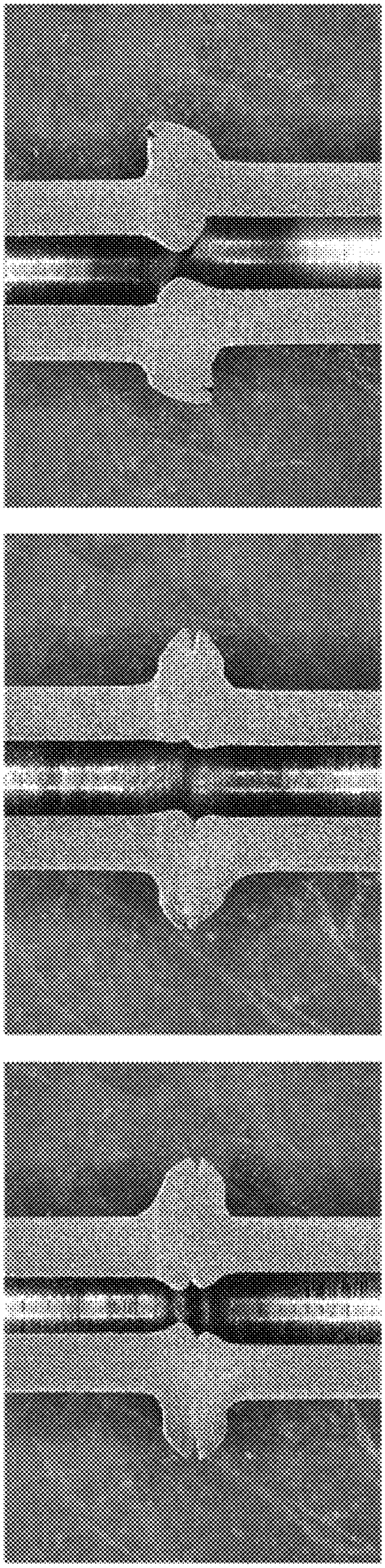
FIG. 9 is a cross-sectional photograph of the example embodiment of the solid-state joined joint obtained at each angle θ when the burn-off length is 6 mm.

FIG. 9 shows cross-sectional photographs of the example embodiment solid-state joined joints obtained at each angle θ when the burn-off length was 6 mm. Note that the cut surface was set at a position 3 mm from the outermost circumference of the pipe toward the center, and FIG. 9 shows the joined surfaces on both sides. When the angle θ is 15°, the burrs slightly penetrate to the inside of the pipe, but when the angle θ is 30°, the formation of burrs on the inside of the pipe is almost completely suppressed. On the other hand, when the angle θ is increased to 45°, the contact portion forming the interface to be joined becomes too sharp, and a deviation is observed in the joined surface.

EXPLANATION OF SYMBOLS

2 . . . . One material to be joined,
4 . . . . Other material to be joined,
6 . . . . Interface to be joined,
10 . . . . Solid-state joined joint,

12 . . . . One pipe material,
14 . . . . The other pipe material,
16 . . . . Solid-state joined interface,
20 . . . . Solid-state joining device,
22 . . . . Pressurizing mechanism,
24 . . . . Energization mechanism,
26 . . . . Burn-off length controlling mechanism.

The invention claimed is:

1. A solid-state joining method, comprising:

bringing end portions of one material to be joined and the other material to be joined into contact with one another to form an interface to be joined;

applying a pressure to the interface to be joined in a direction perpendicular to the interface to be joined, wherein the pressure is set to be equal to or higher than a yield strength of the one material to be joined and/or the other material to be joined at a desired joining temperature;

increasing a temperature in the vicinity of the interface to be joined to the desired joining temperature by using an external heating means which is energization heating while the pressure is applied perpendicular to the interface to be joined; and plastically deforming the interface to be joined to discharge burrs and form a solid-state joined interface, wherein a plate thickness of the end portion of the one material to be joined and/or the other material to be joined is reduced toward a side where the discharge of the burrs is suppressed, at the time when the temperature just reaches the desired joining temperature, the interface to be joined is deformed so that the solid-state joined interface is formed, and a rotation mechanism of a friction welding device and a linear sliding mechanism of a linear friction welding are not involved in the solid-state joining method.

2. The solid-state joining method according to claim 1, wherein the one material to be joined and/or the other material to be joined are hollow cylinders having an outer surface and an inner surface, and the plate thickness is a thickness between the outer surface and the inner surface.

3. The solid-state joining method according to claim 1, wherein the end portion of the one material to be joined and/or the other material to be joined is inclined at an angle of 20 to 40°.

4. The solid-state joining method according to claim 1, wherein the pressure is set to be equal to or higher than the yield strength of the one material to be joined and/or the other material to be joined at the desired joining temperature, and less than a tensile strength of the one material to be joined and/or the other material to be joined at the desired joining temperature.

5. The solid-state joining method according to claim 1, wherein the solid-state joining method does not include a rotation of at least one of the one material to be joined or the other material to be joined for a friction welding and a linear sliding of at least one of the one material to be joined or the other material to be joined for a linear friction welding.

* * * * *